United States Patent [19]

Nishimura et al.

[11] Patent Number: 4,933,781
[45] Date of Patent: Jun. 12, 1990

[54] RECORDING METHOD AND A RECORDING AND/OR REPRODUCING APPARATUS

[75] Inventors: Hiroshi Nishimura, Saitama; Tatsuo Ogawa, Shizuoka, both of Japan

[73] Assignee: Sony Corporation, Tokyo, Japan

[21] Appl. No.: 262,109

[22] Filed: Oct. 19, 1988

Related U.S. Application Data

[63] Continuation of Ser. No. 158,280, Feb. 18, 1988, abandoned, which is a continuation of Ser. No. 829,164, Feb. 14, 1986, abandoned.

[30] Foreign Application Priority Data

Feb. 15, 1985 [JP] Japan .................. 60-27727

[51] Int. Cl.$^5$ .................. G11B 5/02; G11B 15/48
[52] U.S. Cl. .................. 360/18; 360/27; 360/74.1
[58] Field of Search .................. 360/18, 27, 71, 72.2, 360/74.1

[56] References Cited

U.S. PATENT DOCUMENTS 4,570,189 2/1986 Lode .................. 360/50

Primary Examiner—Vincent P. Canney
Attorney, Agent, or Firm—Hill, Van Santen, Steadman & Simpson

[57] ABSTRACT

A recording system and a recording and/or reproducing apparatus in which a first information unit signal is recorded on a recording medium; a first data unit signal relating to the first information unit signal is recorded on the recording medium at the rear side of the first information unit signal; when a succeeding second information unit signal newly appears thereafter, second information unit signal is recorded on the recording medium at the rear side of the first information unit signal; and a second data unit signal relating to the second information unit signal and the first data unit signal are recorded together on the recording medium at the rear side of the second information unit signal.

30 Claims, 8 Drawing Sheets

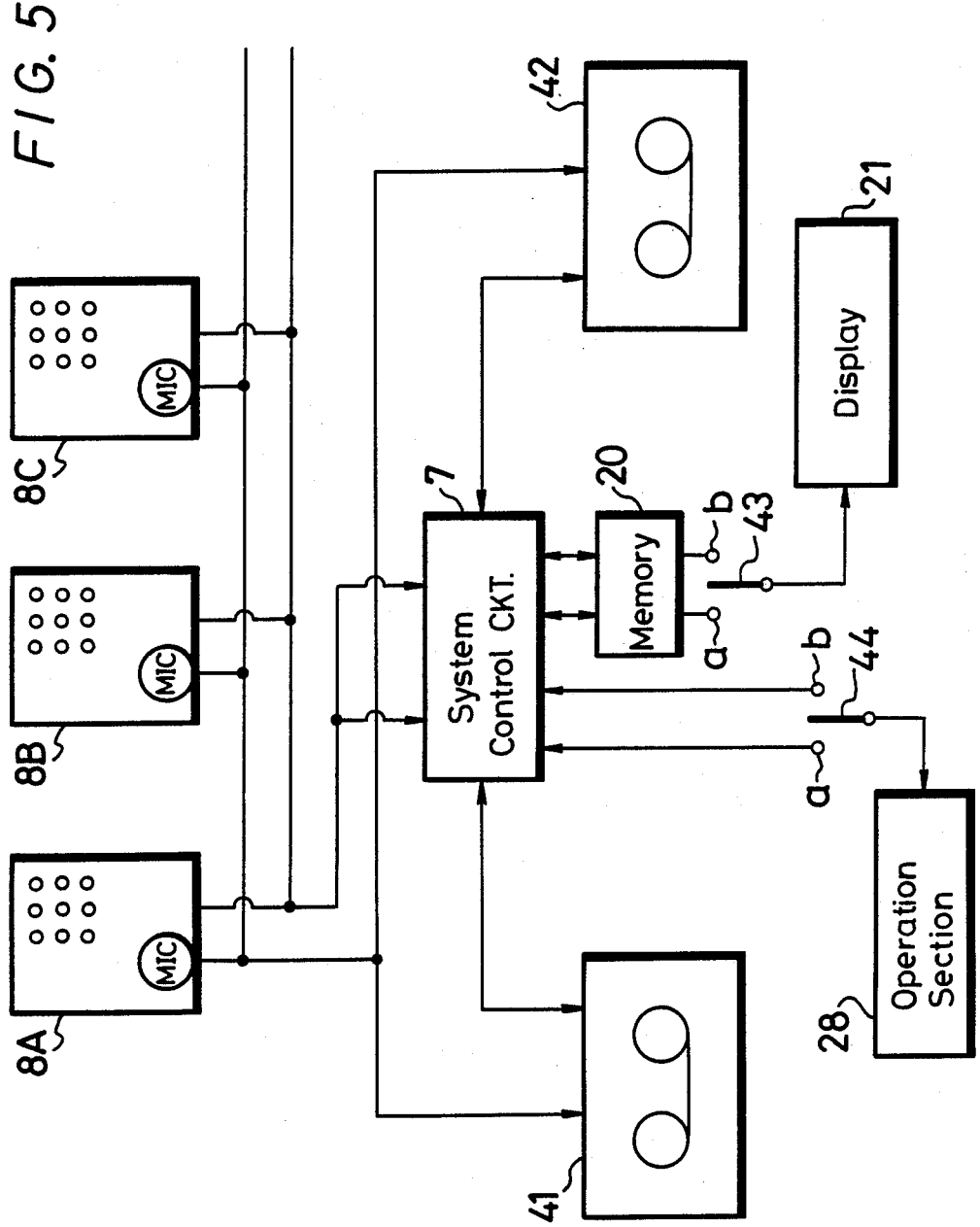

RECORDING METHOD AND A RECORDING AND/OR REPRODUCING APPARATUS

This is a continuation of application Ser. No. 158,280 filed Feb. 18, 1988, now abandoned, which is a continuation of Ser. No. 061 829,164 filed 2/14/86 now abandoned.

BACKGROUND OF THE INVENTION

1. Field of the Invention

The present invention relates to a recording system in which a plurlaity of information unit signals and a plurality of data unit signals relating to the information unit signals are respectively recorded on a recording medium as a recording format and a recording and/or reproducing apparatus in which such a recording medium conforming to the above recording format is used.

2. Description of the Prior Art

In a prior art dictating and recording system using a plurality of remote controllers connected to a tape recorder to record an audio signal at a distant place, information data, such as a recording time, an identifying number, and the like, corresponding to an information unit signal relating to each audio signal are simultaneously recorded with the audio signal. In that case, the sudio signal and the data are respectively recorded adjacent each other but on different tracks. Upon reproducing, the data is first extracted and read out from the track and then the corresponding audio signal indicated by such data is reproduced and heard.

According to such prior art recording system, the audio signal and the data as mentioned above are recorded on a magnetic tape with a recording format as, for example, shown in FIG. 1. That is, as shown in FIG. 1, this recording system is such one in which audio signals (messages MSG1, MSG2, MSG3, MSG4, . . . ) are respectively recorded on an audio track AT and respective data are recorded on a data track DT at the positions which correspond to the end portion of each audio signal.

In the case of the prior art recording system for recording the corresponding data at the end portion of each audio signal, if it is intended to read out the data, it is necessary to read all of the data recorded on the tape. As a result, the whole of the tape must be rewound, fast-forwarded, and so on, to thereby search the recorded position of each item of data and then to read out the data or the like. Thus substantial time is required for extracting and reading out the data.

Further, in the prior art remote recording system, such as a dictating and recording system, upon recording of such an information unit signal which needs emergency attention, its identifying number is assigned and the information unit signal with the identifying number superimposed is inputted thereto, while at the recorder side, the identifying number is evaluated, and hence the emergency that the recorded data or content should be processed can be known. In this case, however, since the judgment that at which position on the tape the content needing the emergency attention is stored is carried out by a process by which, the identifying number data, which are printed on an index slip or the like and delivered when the corresponding tape is ejected, are checked one by one, this operation requires substantial time and the handling becomes troublesome.

SUMMARY OF THE INVENTION

Accordingly, it is an object of this invention to provide a recording system suitable for a recording format in which respective information unit signals are consecutively recorded on a first recording track on a recording medium and respective information data corresponding to the respective information unit signals are recorded together on a second recording track of the recording medium, while when the information data recorded are read out, it is not necessary to search almost all of the recording medium, but regardless of the reproducing position for the recording medium, the data can be rapidly and easily extracted and read out.

Another object of this invention is to provide a recording and/or reproducing apparatus in which all data information recorded on the recording medium in the form of accumulated data are read out, stored and then selectively displayed as required so that the data unit signal corresponding to each information unit signal can be discriminated immediately and also the position of the information unit signal portion can be found in a very short period of time by depressing a key.

A further object of this invention is to provide a recording and/or reproducing apparatus in which all data information, which are recorded on a recording medium in the form of the accumulated data and which contain a specific and corresponding priority number signal recorded as the data unit signal as required, are read out, stored and the fact that the specific and corresponding priority number signal is detected and then displayed so that it is possible to immediately grasp the fact that the information, which is high in emergency degree, is recorded on the recording medium.

According to one aspect of the present invention, there is provided a recording system for recording on a recording medium a plurality of information unit signals and data unit signals relating to said information unit signals, comprising:

(a) a first step for recording a first information unit signal and recording a first data unit signal relating to said first information unit signal immediately following, i.e., on the rear side of said first information unit signal; and (b) a second step for recording a second information unit signal on the rear side of said first information unit signal and recording a second data unit signal relating to said second information unit signal and said first data unit signal on the rear side of said second information unit signal.

According to another aspect of the present invention, there is provided a recording and/or reproducing apparatus for recording and/or reproducing a plurality of information unit signals and a data unit signal relating to each of said information unit signals on and/or from a recording medium comprising:

(a) first recording and/or reproducing means including a first recording and/or reproducing transducer head for recording and/or reproducing said information unit signal on and/or from sid recording medium;

(b) second recording and/or reproducing means including a recording and/or reproducing transducer head for recording and/or reproducing said data unit signal on and/or from said recording medium;

(c) drive means for driving said recording medium in accordance with at least a recording mode, a reproducing mode and a stop mode;

(d) control means for controlling said first and second recording and/or reproducing means and said drive means;

(e) first recording means for recording a first information unit signal and recording a first data unit signal relating to said first information unit signal on a rear side of said first information unit signal by said control means; and (f) second recording means for recording a second information unit signal on a rear side of said first information unit signal and recording a second data unit signal relating to said second information unit signal and said first data unit signal on a rear side of said second information unit signal by said control means.

These and other objects, features and advantages of the present invention will become apparent from the following detailed description of the preferred embodiments taken in conjunction with the accompanying drawings, through which like reference numerals designate like elements and parts.

BRIEF DESCRIPTION OF THE DRAWINGS

FIG. 5 is a circuit block diagram showing an application example of the present invention;

DESCRIPTION OF THE PREFERRED EMBODIMENTS

Now, the present invention will hereinafter be described in detail with reference to FIGS. 2 to 7.

Figure 2:
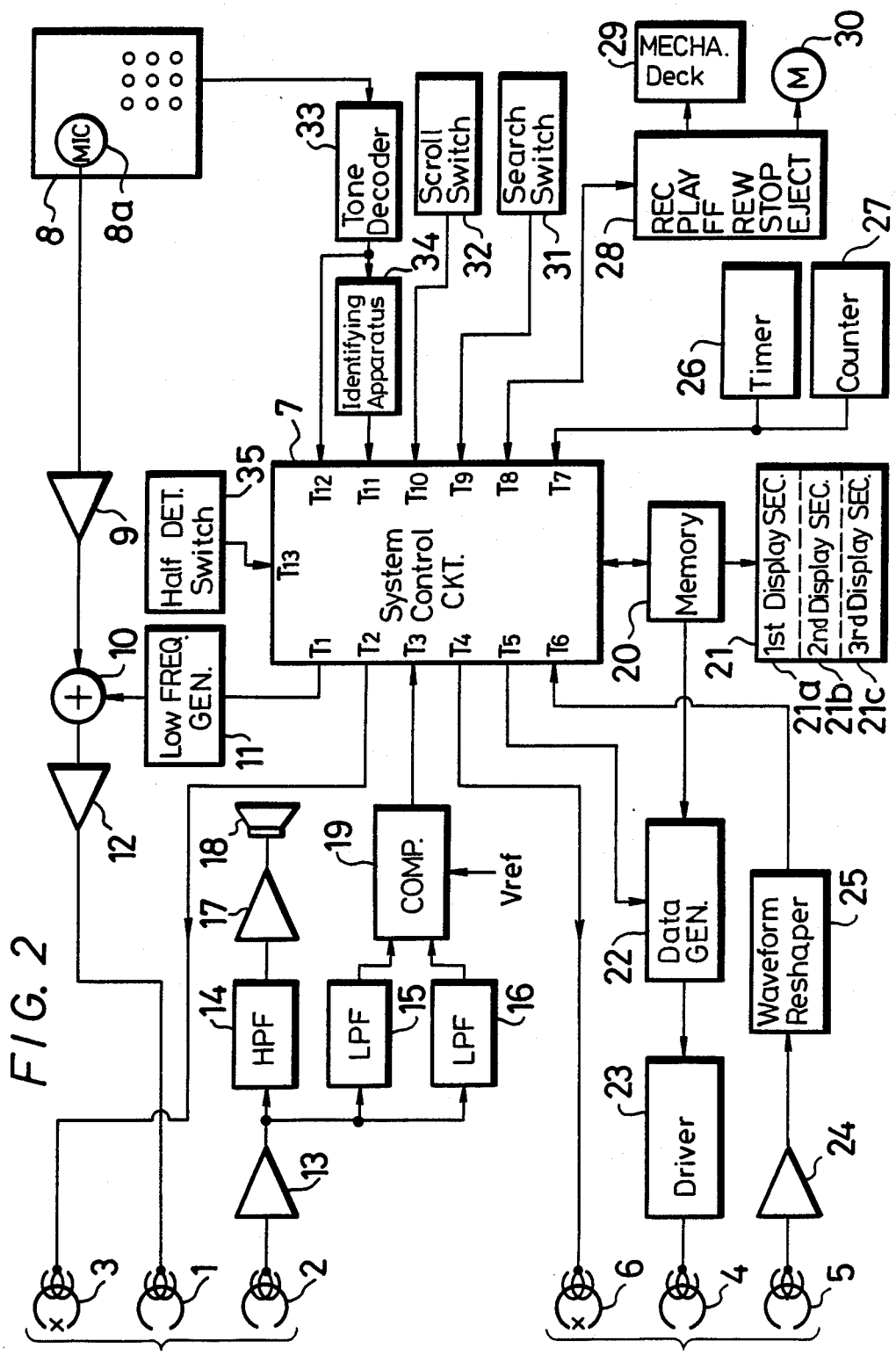
FIG. 2 is a circuit block diagram showing an embodiment of a recording and/or reproducing apparatus according to the present invention.
Figure 2A:
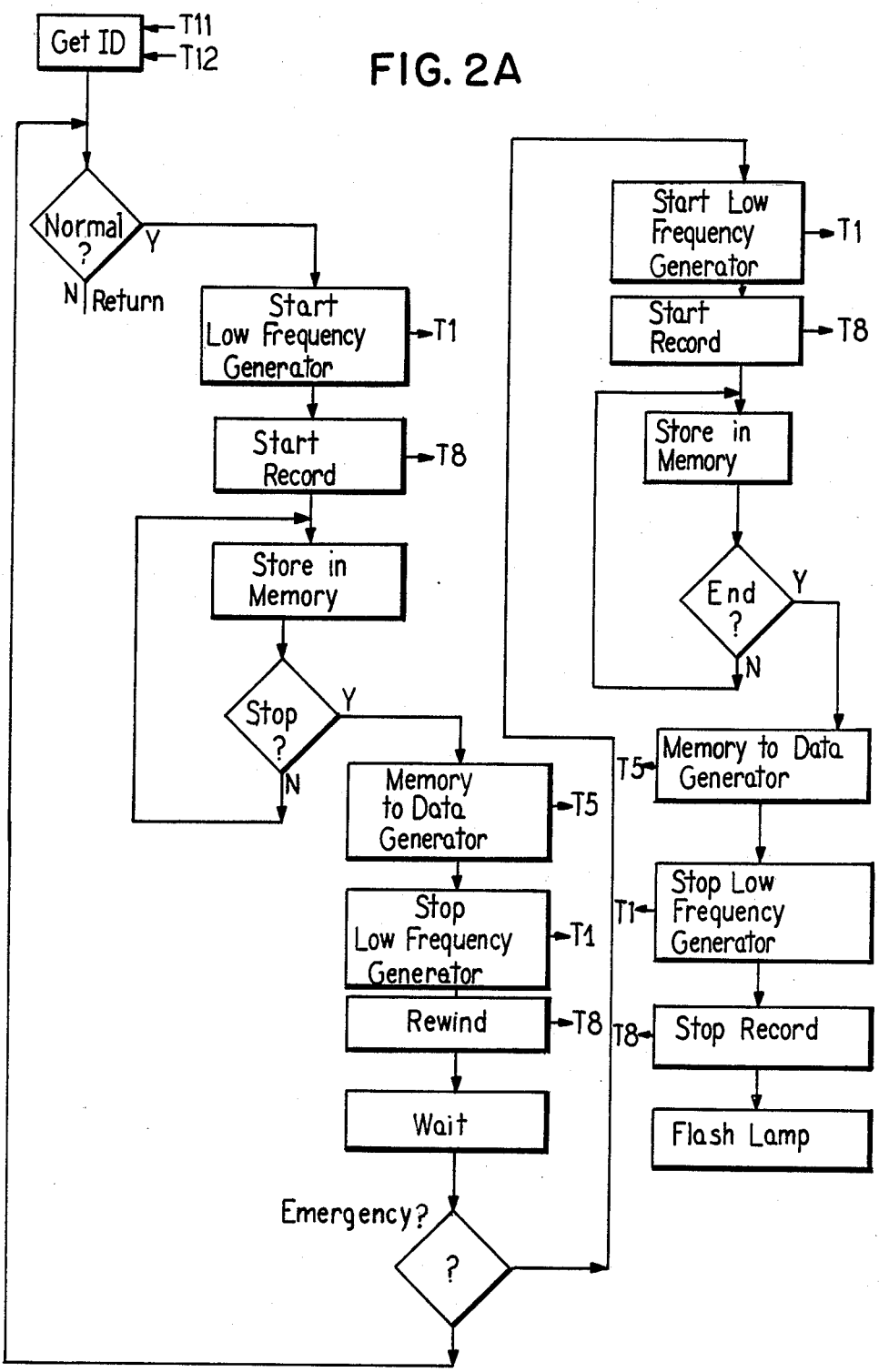
FIGS. 2A-2B are flow charts illustrating operation of the system control unit of FIG. 2.
Figure 2B:
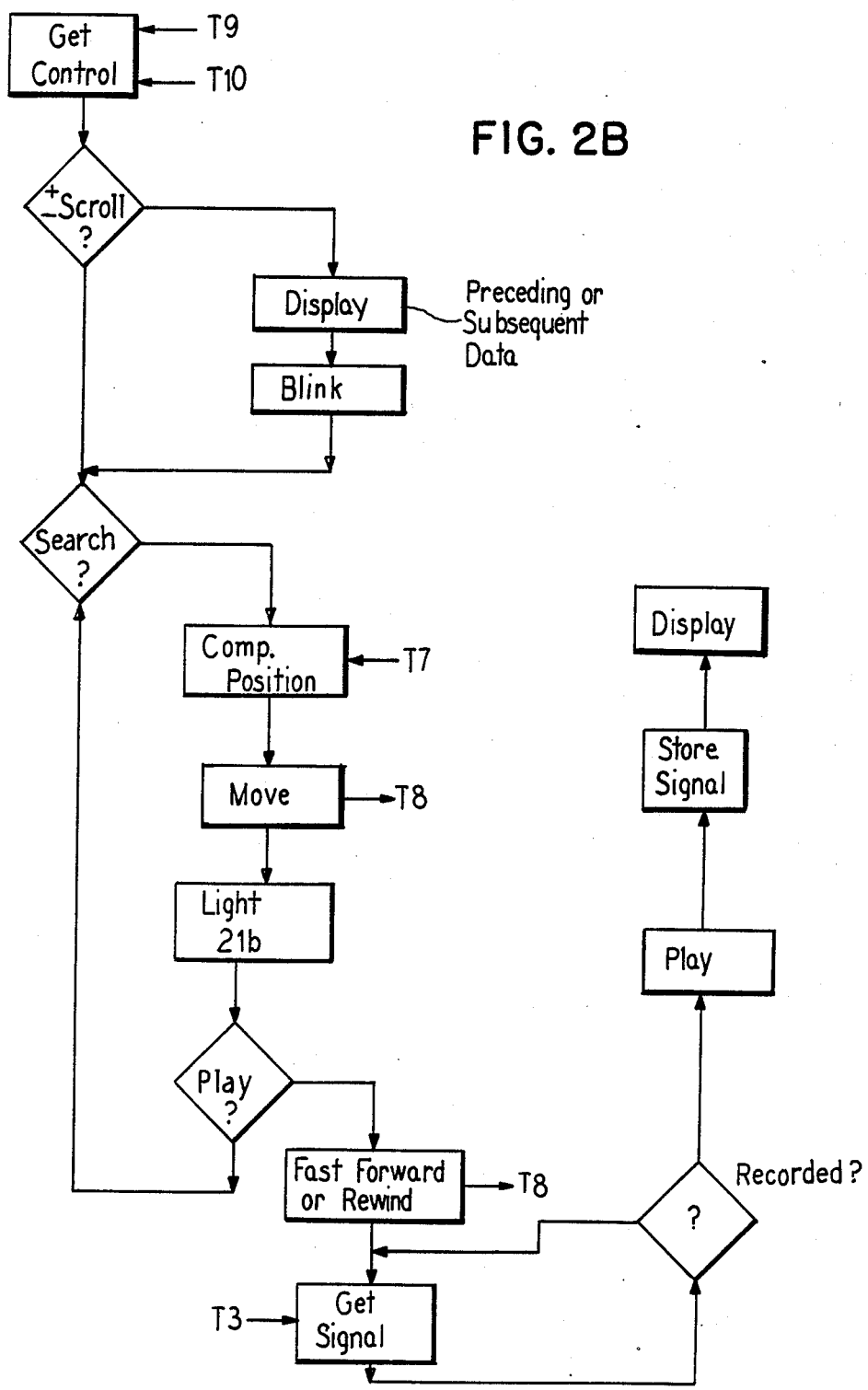

FIG. 2 is a circuit block diagram showing an embodiment of a recording and/or reproducing apparatus according to the present invention.

Referring to FIG. 2, there are provided a recording head 1, a reproducing head 2, and an erase head 3 for an audio track, respectively, while there are provided a recording head 4, a reproducing head 5, and an erase head 6 for a data track, respectively. A system control circuit 7 is provided which is adapted to control respective apparatus in order to carry out a series of operations relating to the tape transportation and various operations done by function key input. The erase heads 3 and 6 are connected to terminals T2 and T4 of the system control circuit 7, respectively. A remote station or user terminal apparatus 8 is located in a remote place. This user terminal apparatus 8 incorporates therein a microphone 8a and includes ten keys and a tone encoder (not shown) so that a recording signal can be delivered to the main body of a tape recorder located in the remote place by using the microphone 8a and that a tone encode signal corresponding to each of the ten keys is generated and transmitted to the main body of the tape recorder as a command. The audio signal from the microphone 8a is supplied through an amplifier 9 to one of input sides of an adder 10. A low frequency oscillator 11 is controlled by the control signal derived from a terminal T1 of the system control circuit 7. Upon recording, this low frequency generator 11 generates a particular low frequency signal, for example, a signal with the frequency of 20 Hz, which is fed to the other input side of the adder 10 in which it is superimposed upon the audio signal from the microphone 8a. An amplifier 12 is connected between the adder 10 and the audio recording head 1.

An amplifier 13 is provided at the output side of the audio reproducing head 2 and a high pass filter 14 is provided at the output side of the amplifier 13. Low pass filters 15 and 16 are also provided at the output side of the amplifier 13. The high pass filter 14 is adapted to remove the low frequency signal generated from the low frequency generator 11. The low pass filter 15 is adapted to detect the low frequency signal generated from the low frequency generator 11, while the low pass filter 16 is adapted to detect a low frequency signal of an original audio signal. At the output side of the high pass filter 14, there are provided an amplifier 17 and a loudspeaker 18, while at the output sides of the low pass filters 15 and 16, there is provided a comparator 19. The comparator 19 has a predetermined reference value Vref, and when the output levels of the low pass filter 15 or 16 exceed this reference value Vref, the comparator 19 produces an output signal which will be fed to a terminal T3 of the system control circuit 7, whereby it is confirmed whether or not an information is recorded on the recording medium or whether or not at least the low frequency signal (20 Hz) exists thereon.

A memory is provided which stores therein a data information corresponding to each of the audio signals, and a display apparatus 21 is provided which is adapted to display thereon the data information, and so on, corresponding to the audio signal that is recorded on the recording medium. The display apparatus 21 includes a first display section 21a, a second display section 21b, and a third display sectin 21c. As will be described later, the first display section 21a is used to display thereon all the data information corresponding to the respective audio signals (information unit signals) that will be recorded on the recording medium; the second display section 21b is used to display thereon the data information of each information unit; and the third display section 21c is used to display thereon a priority, and so on, by lighting an indicator lamp thereof.

A data generator 22 is provided which, under the control of the system control circuit 7, converts the data information read out from the memory 20 to a recording format that can be recorded on the recording medium. A data recording driver 23 is provided between the data recording head 4 and the data generator 22.

At the output side of the data track reproducing head 5, there are provided an amplifier 24 and a waveform reshaper 25. The data information played back from the recording medium by the data reproducing head 5 is supplied through the amplifier 24 and the waveform reshaper 25 to a terminal T6 of the system control circuit 7. The data information supplied thereto is stored in the memory 20 and then displayed on the display apparatus 21.

A timer 26 is provided so as to measure the recording time of the audio signal and a counter 27 is provided which is adapted to count the revolutions of a reel so as to detect a tape position. The outputs from the timer 26 and the counter 27 are both fed to a termianl T7 of the system control circuit 7. An operation section 28 of the tape recorder proper includes a playback button (PLAY), a fast-forward button (FF), a rewind button (REW), a stop button (STOP), an eject button (EJECT), and so on. In this case , the recording of the audio signal on the tape is carried out by operation a recording button (not shown) provided on the user terminal apparatus 8 and the system control circuit 7. The operation section 28 and a terminal T8 of the system control circuit 7 are connected to each other. For the operation section 28, there are provided a mechanical deck section 29 and a motor 30 of the tape recorder, respectively. Terminals T9 and T10 of the system control circuit 7 are connected to a search switch (SEARCH) 31 and a scroll switch (SCROLL) 32, respectively. The scroll switch 32 is used when each information data stored in the memory 20 is displayed on the display apparatus, 21, while the search switch 31 is used when the position or the beginning of the audio signal (the information unit) is detected on the basis of the information data displayed on the display apparatus 21.

A tone decoder 33 is provided, which is adapted to detect and to identify the tone signals corresponding to the ten keys which are sent from the user terminal apparatus 8. An identifying apparatus 34 is formed of, for example, and AND gate to identify the priority number and is adapted to check whether the signal delivered from the tone decoder 33 coincides with the priority number or not. The output signal from the identifying apparatus 34 is supplied to a terminal T11 of the system control circuit 7, instructing that the information to be recorded must be processed immediately. Also, the output signal from the tone decoder 33 is supplied to a terminal T12 of the system control circuit 7. In this case, if such output signal is not coincident with the tone signal of the priority number, the system control circuit 7 indicates that the information to be recorded is information of the normal recording mode which does not need emergency processing. A half detecting switch 35 is provided which is adapted to detect whether or not a tape cassette is mounted on a cassette compartment portion.

The operation of this circuit shown in FIG. 2 will be described next with reference to FIGS. 3A to 3D and FIG. 4. (a) Recording mode (FIGS. 2 and 3)

For normal recording, before recording a message , the ten keys of the user terminal apparatus 8 are operated to input a predetermined identifying code (ID) indicative of what style the recording information will be dictated, how the recording information will be processed or who is the applicant for the information to be recorded, etc. Then, the tone encoder (not shown) within the user terminal apparatus 8 generates the tone signal corresponding to the key input and the resultant tone signal is transferred to the tone decoder 33 at the tape recorder (deck) side. The tone decoder 33 interprets the tone signal transmitted and supplies the decoded output to the identifying apparatus 34. In this case, since the mode is the normal recording mode that does not need emergency processing, based upon the signal supplied from the tone decoder 33 to the terminal T12 of the system control circuit 7, the system control circuit 7 allows the output signal from the terminal T1 to operate the low frequency amplifier 11 and also allows the operation section 28 to place the mechanical deck section 29 and the motor 30 in the recording mode. Consequently, the audio signal from the microphone 8a of the user terminal apparatus 8 is amplified by the amplifier 9 and then fed to one input side of the adder 10, in which it is added with a low frequency signal having the frequency of 20 Hz supplied to the other input of the adder 10 from the low frequency generator 11. The audio signal superimposed with with the low frequency signal is amplified by the amplifier 12 and then fed to the audio recording head 1, and thereby recorded on a recording medium, for example, a magnetic tape.

During a period in which this audio signal is recorded on the recording medium, the system control circuit 7 permits the memory 20 to store therein various information relating to the audio signal, such as the recording time, the recording position (tape position), the emergency degree, the identification code (ID), etc., as information data.

Figure 3A:
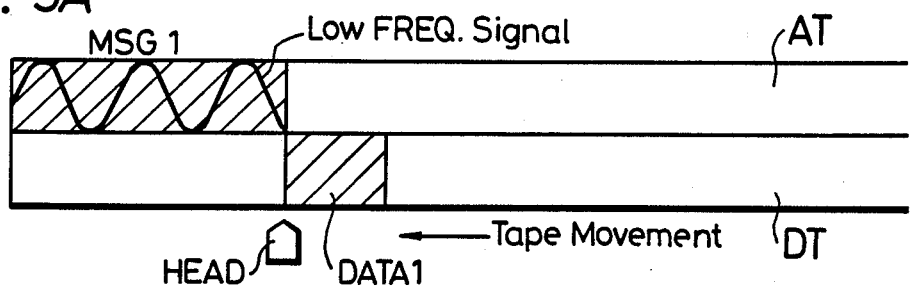
FIGS. 3A to 3D are respectively recording formats of the present invention.

When the recording of the audio signal is ended, or when a recording stop is executed, such as when a stop command (STOP) is inputted to the system control circuit 7 by operating the ten keys on the user terminal apparatus 8, the various information signals relating to the audio signal and so far accumulated in the memory 20 are read out from the memory 20 and delivered to the data generator 22 in which they are converted into the information data conforming to the recording format of the recording medium. The information data from the data generator 22 is supplied through the driver 23 to the data recording head 4, whereby the information data is recorded on the data track of the recording medium. When the aforesaid recording of the audio signal is ended, the operation of the low frequency generator 11 is stopped by the control of the system control circuit 7. Then, after the information data has been recorded on the tape, the magnetic tape is rewound up to the beginning of the information data, in accordance with the count number of the tape reel table data stored in the memory that is, to the point at which the recording of the audio signal is ended and is then stopped. In other words, the recording or reproducing heads are all placed at the boundary between the audio signal and the information data. Accordingly, at that time, the recorded state of the tape becomes as shown in FIG. 3A. In FIG. 3A, reference AT designates the audio track and DT designates the data track, respectively. FIG. 3A illustrates that an audio signal MSG1 superimposed with the low frequency signal is recorded on the audio track AT and for this audio signal MSG1, the information data is recorded on the data track DT as data 1. When the mode is changed from the illustrated state of FIG. 3A to the next recording mode and an audio signal MSG2 is inputted from the side of the user terminal apparatus 8 as the next information unit signal, the system control circuit 7 permits the low frequency generator 11 to operate and the low frequency signal from the low frequency generator 11 is supplied to the adder 10 and therein superimposed upon the audio signal so that it is recorded on the audio track AT by the audio recording head 1 as the audio signal MSG2. At the same time, the data 1 recorded on the data track DT, is once erased by the erase head 6. Further, during a period when the audio signal MSG2 is recorded on the audio track AT, similarly as earlier noted, the system control circuit 7 permits the memory 20 to store therein the information data relating to the audio signal MSG2 as data 2.

Figure 3B:
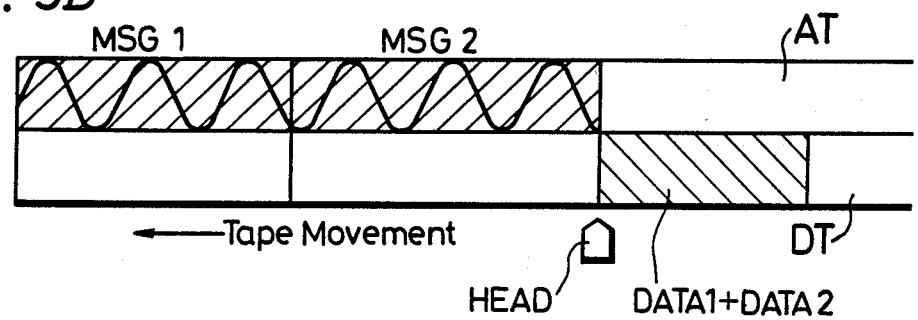

When the recording of the audio signal MSG2 is ended, at this time, all the data so far stored in the memory 20, that is, the data (data 1+data 2) formed of the data 1 relating to the audio signal MSG1 and the data 2 relating to the audio signal MSG2 are read out from the memory 20 and converted to information data conforming to the recording format by the data generator 22, which is then supplied through the driver 23 to the data recording head 4 and thereby recorded on the data track DT of the recording medium. Also at the time, after the recording of the information data (data 1+data 2) is ended, the magnetic tape is rewound up to the top or beginning of the information data (end point of the audio signal MSG2) and the tape recorder is put into a standby mode to await the recording of a next audio signal MSG3. FIG. 3B illustrates the state of the recording format on the tape at this time. From FIG. 3B, it will be apparent that the information data relating to the audio signal MSG1 and the informatin data relating to the audio signal MSG2 are recorded on the side of the data track DT corresponding to the end portion of the next audio signal MSG2 as the added data of (data 1+data 2).

Figure 3C:
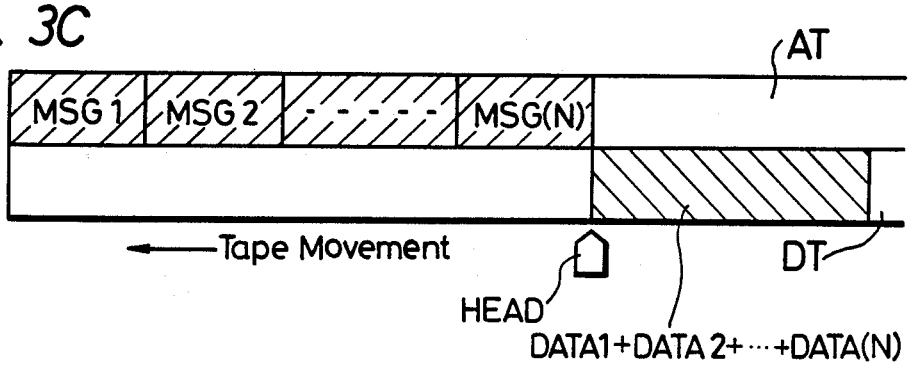
Figure 3D:
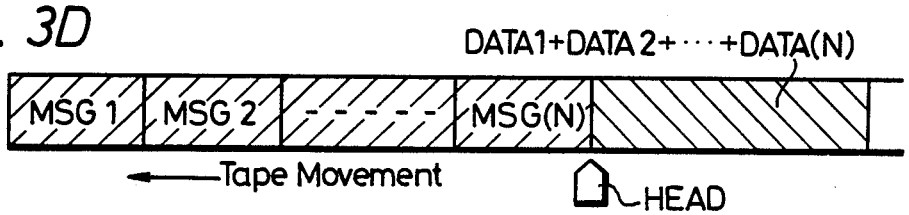

As described above, the audio signals are sequentially recorded on the audio track AT of the tape as the information unit signals and the information data corresponding to the audio signals are gathered together and then recorded on the data track DT at the position corresponding to the end portion of the latest-recorded audio signal. FIG. 3C illustrates the state of the recording format of the tape at that time.

When the recording needs emergency processing, such recording is carried out as follows. The identification code ID, the priority number that is predetermined by the user terminal apparatus, 8 is inputted by operating the ten keys. Then, the tone signal corresponding to the operated key is generated by the tone encoder and then transferred to the tone decoder 33 at the tape recorder (deck) side. The tone decoder 33 interprets the tone signal transferred thereto and sends the decoded signal to the identifying apparatus 34. The identifying apparatus 34 identifies it as indicating a recording which needs emergency processing and supplies the output therefrom to the terminal T11 of the system control circuit 7. The system control circuit 7 adds, to the information data item a data indicative of the fact that the signal to be recorded at present needs emergency processing via the memory 20 and allows a priority indicator lamp (corresponding to an indicator lamp 63 of FIG. 6, which will be described later) included in the display section 21c of the display apparatus 21 to be turned on and off, i.e., to flicker to display such fact. At the same time, the system control circuit 7 drives the mechanical deck section 29 and the motor 30 through the operation section 28 and thereby the recording is started as described above.

When the signal indicative of the end of the recording is detected by the tone decoder 33, the system control circuit 7 supplies a signal through the operation section 28 to the mechanical deck section 29 and the motor 30 to stop the recording. Simultaneously, the priority indicator lamp in the display apparatus 21 changes its state from flickering or flashing to being fully lit.

In this way, the signals of various contents are recorded on the tape. Also, in the course of the recording, the fact that data needing the emergency processing is recorded on the tape can be detected by the priority indicator lamp of the display appartus 21, and through the information data in the memory 20. The place at which the data needing the emergency processing is recorded can be searched for on the display provided by the display sections 21a and 21b of the display apparatus 21, and thus the beginning of the data on the tape can be found out, as will be mentioned later. While FIGS. 3A to 3C illustrate the recording formats in which the plurality of tracks are formed on the recording medium and the audio and data signals are separately recorded on the audio tracks and the data tracks, respectively, it is possible to easily record the audio signal (information unit signal) and the data information signal on one track (see FIG. 3D).

Figures 1, 4:
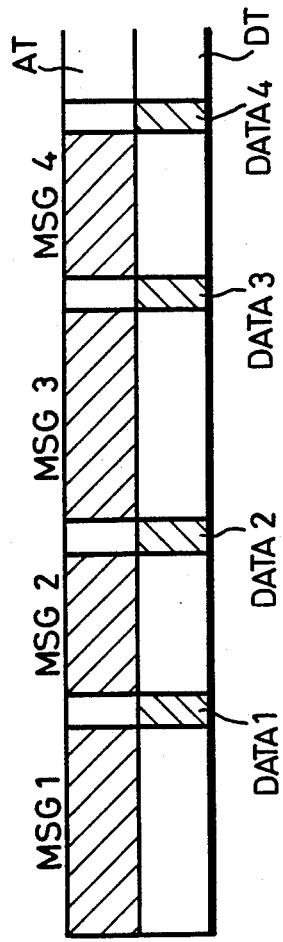
FIG. 1 is a diagram showing a prior art recording format.
FIG. 4 is a diagram showing a pattern of content stored in a memory according to the present invention.

(b) Data reading mode (FIGS. 2 and 4)

When a tape cassette housing therein a magnetic tape on which an audio signal and an information data are previously recorded with a predetermined recording format is mounted in the cassette compartment section (in a transcribe mode in which only the playback is possible, as described later) and the information data recorded is read out from the magnetic tape, if a data reading button (corresponding to a button 62 in FIG. 6) included in the operation section 28 is depressed and the system control circuit 7 is commanded to read out the data, the system control circuit 7 operates drives, through the operation section 28, the mechanical deck section 29 and the motor 30, so as to fast-forward or rewind the tape. Then, the audio track is traced by the audio reproducing head 2, and the particular low frequency signal (20 Hz) superimposed on the audio signal, which is supplied through the amplifier 13, is detected by the low pass filter 15, and the tape is forwarded to the position at which this particular low frequency signal is not recorded. At that time, the audio and data reproducing heads 2 and 5 are positioned at the boundary between the audio signal and the information data.

Then, when the data track is traced by the data reproducing head 5, the signal reproduced by the reproducing head 5 is derived through the amplifier 24 and the wave-reshaper 25. Based on this reproducing signal, the information data is read out and stored in the memory 20 via the system control circuit 7. As shown in FIG. 4, in the memory 20, there are stored all the information data relating to the respective audio signals and the information unit signal of every audio signal. Specifically, as information data, there are stored a call number indicative of how many times the audio signals or calls are recorded and the whole recording time thereof. Whereas, as data information applying to each call, there are stored the recording time of the corresponding audio signal, the identifying code ID indicative of the kind of the processing thereof, CALL NO. indicative of the sequential order of the recording, presence or absence of the priority code indicative of the priority degree (emergency degree), the count numbers of the reel table indicative of the count number and which is used to detect the tape starting and ending positions at which recording is started and ended.

Once all the information data are stored in the memory 20, the contents thereof are displayed by the display apparatus 21. Since all the information data stored in the memory 20 cannot be all displayed on the display apparatus 21 at one time, after the storing in the memory 20 has ended, the number of calls, the recording time and the information data (except the counted value) corresponding to the latest-recorded audio signal are only displayed by the display apparatus 21.

(c) Scroll and search modes (FIG. 2)

In the display apparatus 21, only the information data corresponding to the lastest-recorded audio signal can be displayed on the display section 21b as mentioned above. Therefore, when the scroll switch 32 is operated, by having both+and−switches depressed on the system control circuit 7, the displayed content on the display section 21b of the display apparatus 21 is changed so that other information data stored within the memory 20, namely, the information data corresponding to the preceding audio signal and the information data corresponding to the succeeding audio signal can be seen. Thus, information data corresponding to each audio signal can be known, one at a time. Under the state of the scroll mode, the display section 21b of the display apparatus 21 is made to blink.

When the position (or beginning) of the audio signal corresponding to the information data selectively displayed by the above-mentioned scroll mode is desired to be found, the search switch 31 is depressed. Then, the system control circuit 7 compares the information data displayed with the current tape position, or compares the counted value of the rotational number of the reel table as the information data, relating to the selected audio signal, stored in the memory, with the counted value of the rotational number of the reel table at the current position by the counter 27. When the former is placed at the position after the latter, in other words when the counted value stored on the memory is larger than the counted value of the counter 27, the system control circuit 7 controls through the operation section 28 the mechanical deck section 29 and the motor 30 so as to fast-forward the tape, while when the former is positioned prior to the latter, or when the counted value stored on the memory is smaller than the counted value by the counter 27, the system control circuit 27 permits the operation section 28 to control the mechanical deck section 29 and the motor 30 so as to rewind the tape. Thus, the head is positioned at the beginning of the audio signal corresponding to the displayed information data. At that time, the display on the display section 21b of the display apparatus 21 is changed from the blinking state to the lit state, informing the fact that the beginning of the audio signal has been located.

Thus, the beginning of the desired audio signal can be detected in a short time.

Thereafter, by depressing the playback (PLAY) button on the operation section 28, the system control circuit 7 operates the mechanical deck section 29, the motor 30, and so on, so that the beginning portion of the audio signal can be heard.

(d) Auto eject (AUTO EJECT) mode (FIG. 2)

When in the dictating mode, the tape cassette is mounted on the cassette compartment portion (not shown), the half detecting switch 35 is operated and thence the signal from the switch 35 is supplied to the system control circuit 7. Then, the system control circuit 7 permits the operation section 28 to operate the mechanical deck section 29 and the motor 30 so as to rewind the tape of the tape cassette mounted for a predetermined time period. During this period, the audio signal is read out from the tape by the audio reproducing head 2. When the audio signal is recorded on the tape, the reproduced signal is amplified by the amplifier 13 and then fed through the low pass filters 15 and 16 to the comparator 19 in which it is compared with the reference value Vref, thus to detect whether the signal is recorded on the tape or not.

If the signals supplied from the low pass filters 15 and 16 are larger than the reference value Vref, it is judged that the signal was already recorded on the tape, and the output from the comparator 19 is supplied to the system control circuit 7. Then, the system control circuit 7 permits the operation section 28 to control the mechanical deck section 29 and the motor 30 so as to stop the tape driving operation. At the same time, an eject drive section included in the operation section 28 is operated, ejecting the tape cassette from the tape cassette compartment portion.

When the head reaches the beginning or top end of the tape before a predetermined time since the tape was rewound, the tape is fast-forwarded from the top end of the tape for a predetermined time and then the tape is rewound, thereby to detect the signal.

(e) Applicable example (FIG. 5)

FIG. 5 is a circuit diagram showing an example in which the present invention is applied to a doubledeck-type magnetic recording and/or reproducing apparatus. In this case, the system control circuit 7, the memory 20, the display apparatus 21, the operation section 28 and the reproducing system, etc., used in the circuit of FIG. 2 are used commonly so that the reproducing systems (not shown) of a deck 41 as a first deck and a deck 42 as a second deck are used common and only the recording systems thereof are independent. Referring to FIG. 5, there are provided a plurality of user terminal apparatus 8A, 8B, 8C, . . . From FIG. 5, it will be seen that the audio signals from the microphones of these user terminal apparatus 8A, 8B, 8C, . . . are supplied to the first and second decks 41 and 42 and the signals corresponding to the ten keys of the respective user terminal apparatus 8A, 8B, 8C, . . . are all fed to the system control circuit 7. The memory 20 has a capacity capable of storing the data contents corresponding to the first and second decks 41 and 42. Since the display apparatus 21 cannot display these data thereon simultaneously, a switch 43 is provided between the memory 20 and the display apparatus 21. When the movable contact of the switch 43 is connected to a fixed contact a, the content or data (except the counted value) corresponding to the first deck 41 and shown in FIG. 4 is displayed by the display apparatus 21, while when the movable contact of the switch 43 is connected to a fixed contact b, the content or data (except the counted value) corresponding to the second deck 42 and shown in FIG. 4 is displayed by the display apparatus 21.

Referring to FIG. 5, there is further provided a switch 44 between the system control circuit 7 and the operation section 28. When the movable contact of the switch 44 is connected to a fixed contact a, the operation section 28 is served for the first deck 41, while the movable contact of the switch 44 is connected to a fixed contact b, the operation section 28 is served for the second deck 42.

The first and second decks 41 and 42 can be placed both in the recording mode and, also, one can be placed in the recording mode, while the other can be placed in the reproducing mode.

Figure 6:
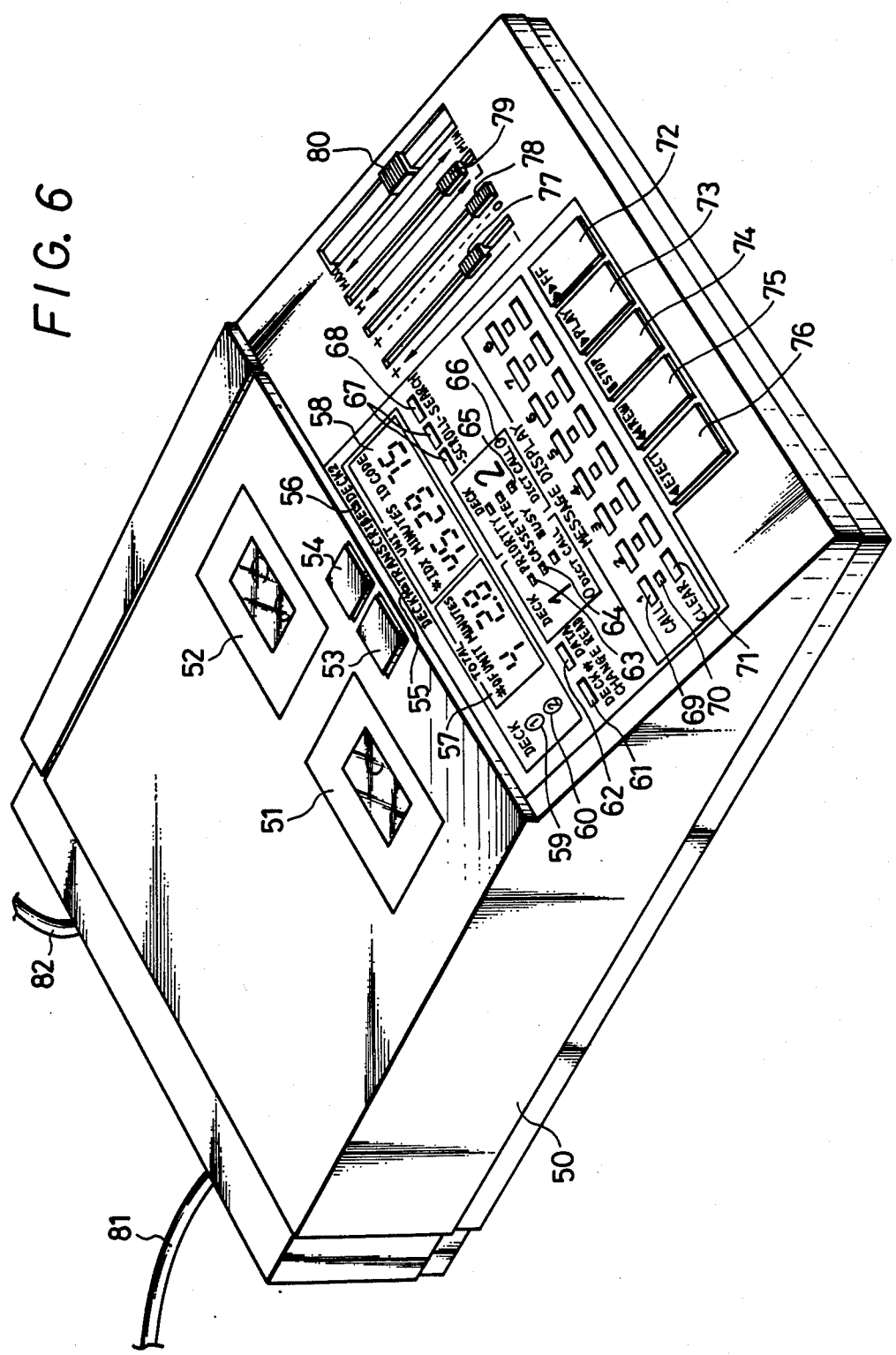
FIG. 6 is a perspective view illustrating an example of a doubledeck-type magnetic recording and/or reproducing apparatus according to the present invention.

(f) Outline of the doubledeck-type magnetic recording and/or reproducing apparatus (FIG. 6)

FIG. 6 schematically illustrates an outline of the doubledeck-type magnetic recording and/or reproducing apparatus. In FIG. 6, reference numeral 50 designates a body of the doubledeck-type magnetic recording and- /or reproducing apparatus. Reference numeral 51 designates a tape cassette compartment portion for the first deck 41 or deck-1 and reference numeral 52 designates a tape cassette compartment portion for the second deck 42 or deck-2. A transcribe mode button 53 is adapted, such that when it is depressed, the deck-1 is placed into only the playback possible state, while a transcribe mode button 54 is adapted, such that when it is depressed, the second deck-2 is placed into only the playback possible state. When the transcribe mode button 53 is depressed, an indicator lamp 55 is lit, while another transcribe mode button 54 is depressed, an indicator lamp 56 is lit. If neither of the transcribe mode buttons 53 and 54 are depressed, both of the deck-1 and deck-2 are placed in the recording (dictating) possible state. Further, reference numeral 57 designates a display section which corresponds to the display section 21a of the display apparatus 21, while reference numeral 58 designates a display section 21b, which corresponds to the display section 21b of the display apparatus 21. When the display sections 57 and 58 are both in the display state corresponding to the deck-1, an indicator lamp 59 is lit, while when the display sections 57 and 58 are both in the display state corresponding to the deck-2, an indicator lamp 60 is lit. A button 61 is adapted to change the display of the content on the display sections 57 and 58 between the deck-1 and the deck-2. Further, a button 62 is used to read out the data when the information data is written in the memory.

Reference numeral 63 designates a priority indicator lamp, and this indicator lamp 63 is made to blink while the content or data needing emergency processing is being recorded, while it is merely lit when the recording is ended. The indicator lamp 63 is lit when the information data or the memory 20 contains the content or data which needs the emergency processing. An indicator lamp 64 is adapted to be lit when the tape cassette is mounted on neither of the cassette compartment sections 51 and 52; to be turned off when the cassette is mounted on either of the cassette compartment sections 51 and 52; is made to blink when the tape approaches the end thereof; and is turned on when the tape reaches its end. An indicator lamp 65 is lit when the deck-1 or the deck-2 is placed in the recording mode. An indicator lamp 66 is adapted to be lit when at least one call message is contained in the tape housed in the tape cassette. Reference numeral 67 designates a switch or button corresponding to the scroll switch 32 of FIG. 2 and which provides two buttons at the + side and the − side in order that the contents before and after the display content can be read out. A switch or button 68 is made corresponding to the search button 31 shown in FIG. 2. Reference numeral 69 denotes a button used for calling up user terminal apparatus. In this case, there are 8 user terminal devices. In this case, eight indicator lamps 70 are provided which are each adapted to be lit when a call is made from the corresponding user terminal apparatus. Reference numeral 71 designates buttons which are used to turn the lit indicator lamp 70 off.

A fast-forward button 76, a playback button 73, a stop button 74, a rewind button 75, and an eject button 76 are mounted on the front panel of the doubledeck-type magnetic recording and/or reproducing apparatus, respectively.

Reference numeral 77 designates a slidable knob to adjust the tape transport speed, reference numeral 78 designates a slidable knob to control the rewinding time in relation to a foot control unit (not shown), reference numeral 79 designates a slidable knob to adjust the tone quality, and reference numeral 80 designates a slidable knob to adjust the sound level upon playback. Further, reference numeral 81 designates a power supply cord, while reference numeral 82 designates a connection cord used to connect the main body of this magnetic recording and/or reproducing apparatus to the user terminal apparatus.

Figure 7:
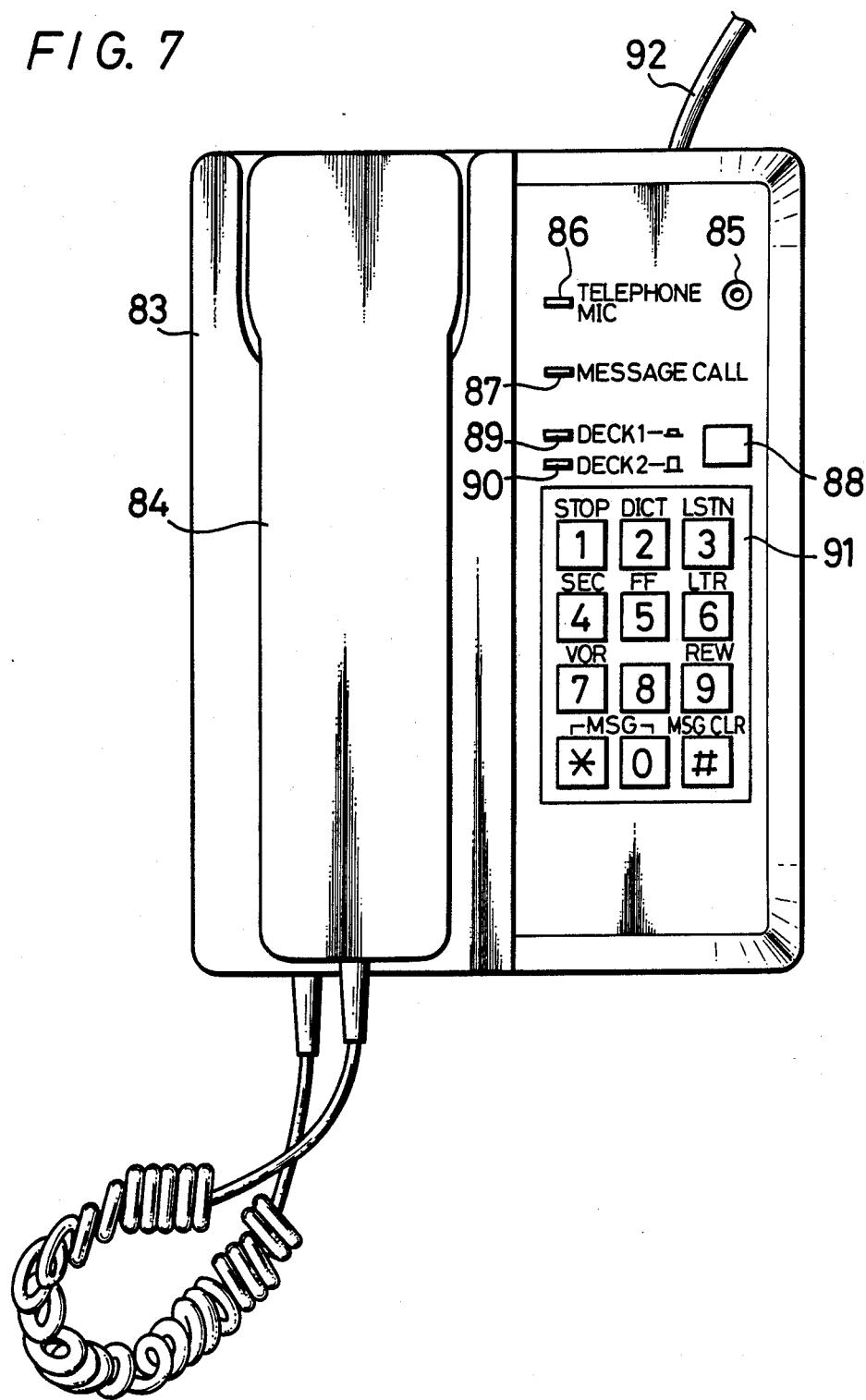
FIG. 7 is a plan view showing one example of a handset of the user terminal apparatus used in the present invention.

(g) Outline of the user terminal apparatus (FIG. 7)

FIG. 7 schematically illustrates an outline of the user terminal apparatus. In FIG. 7, reference numeral 83 designates a base table, reference numeral 84 designates a handset, reference numeral 85 designates a jack to which a telephone coupler (not shown) is to be connected, reference numeral 86 designates an indicator lamp which is lit when the telephone coupler is connected to the jack 85, reference numeral 87 designates an indicator lamp which is turned on and off when a message is sent to the user terminal apparatus from the main body of the magnetic recording and/or reproducing apparatus, and reference numeral 88 designates a button which is used to instruct the main body to select whether deck-1 or deck-2 should be used. For example, when this button 88 is depressed, the display is made to declare that the deck-1 of the main body is used, whereas if the button 88 is released from being depressed, the deck-2 of the main body is selected and an indicator lamp 90 is lit to declare that the deck-2 is now being used.

Reference numeral 91 generally designates ten keys. In the ten keys 91, a button 1 (STOP) is adapted to stop the recording, a button 2 (DICT) is adapted to start the recording, a button 3 (LSNT) is adapted to play back the recorded data or content, a button 4 (SEC) is adapted to record a particular low frequency signal, for example, a signal having the frequency of 750 Hz and to inform the fact that a document is changed, a fast-forward button 5 (FF) is adapted to fast-forward the tape up to the end of the recorded content, a button 6 (LTR) is adapted to record the low frequency signal (20 Hz) on the data track to insert the identification code ID and again to record the same, a button 7 (VOR) is a voice operated recording button which is used in such a case that the magnetic recording and/or reproducing apparatus is automatically stopped if there exists no audio signal for a predetermined period of time, for example, three seconds, and that if the audio signal is inputted thereto, the apparatus is automatically set in the recording mode, a button 8 is a vacant button, a button 9 (REW) is used to rewind the recorded content to the beginning thereof, buttons * and 0 are adapted to be depressed to make an outgoing message call toward the main body from the user terminal apparatus, and a button # is used to clear the incoming message call from the main body. Reference numeral 92 designates a connection cord.

Although the invention has been described with respect to preferred embodiments, it is not to be so limited as changes and modifications can be made which are within the full intended scope of the invention as defined by the appended claims.

We claim as our invention:

1. A method for recording on a recording medium a plurality of information unit signals and data unit signals relating to said information unit signals, comprising the steps of:
  (a) first recording a first information unit signal and recording a first data unit signal relating to said first information unit signal at a position immediately following on the rear side of said first information unit signal; and (b) subsequently recording a second information unit signal at a position immediately following on the rear side of said first information unit signal and recording a second data unit signal relating to said second information unit signal and said first data unit signal at a position immediately following on the rear side of said second information unit signal.

2. The method for recording according to claim 1, in which said second step is such one for recording said second information unit signal on an end portion of said first information unit signal or a start portion of said first data unit signal and recording said second unit data signal relating to said second information unit signal and said first data unit signal on the rear side of said second information unit signal.

3. The method for recording according to claim 1, in which said first step is such a step for recording said first information unit signal on a first track and for recording said first data unit signal relating to said first information unit signal on a second track from a position corresponding to the rear side of said first information unit signal, while said second step is such a step for recording said second information unit signal on said first track at a rear side of said first information unit signal, and recording said second data unit signal relating to said second informatuion unit signal and said first data unit signal on said second track from a position corresponding to the rear side of the second information unit signal.

4. The method of recording according to claim 3, in which said second step is such a step for recording said second information unit signal on said first track corresponding to an end portion of said first information unit signal or a start portion of said first data unit signal and for recording said second data unit signal relating to said second information unit signal and said first data unit signal on said second track from a position corresponding to a rear side of said second information unit signal.

5. The method of recording according to claim 3, in which said second step is such a step for recording said second information unit signal on said first track corresponding to the end portion of said first information unit signal or a start portion of said first data unit signal and for recording said second data unit signal relating to said second information unit signal and said first data unit signal on said second track for a position corresponding to the end portion of said second information unit signal.

6. The method of recording according to claim 1, in which said information unit signal is formed of an audio signal.

7. The method of recording according to claim 1, in which said data unit signal is formed of a signal containing a recording time data of said information unit signal.

8. The method of recording according to claim 1, in which said data unit signal is formed of a signal containing a priority data for said recorded information unit signals.

9. The method of recording according to claim 1, in which said data unit signal is a data signal indicative of a movable position of said recording medium and formed of a signal containing a data signal which indicates the start position or end position of said information unit signal.

10. The method of recording according to claim 1, in which a control signal for controlling the movement of said recording medium is recorded together with said information unit signal.

11. The method of recording according to claim 10, in which said control signal is a predetermined low frequency signal.

12. The method of recording according to claim 1, in which said recording medium is a magnetic tape.

13. A recording and/or reproducing apparatus for recording and/or reproducing a plurality of information unit signals and a data unit signal relating to each of said information unit signals on and/or from a recording medium comprising:

(a) first recording and/or reproducing means including a first recording and/or reproducing transducer head for recording and/or reproducing said information unit signal on and/or from said recording medium;

(b) second recording and/or reproducing means including a recording and/or reproducing transducer head for recording and/or reproducing said data unit signal on and/or from said recording medium;

(c) drive means for driving said recording medium in accordance with at least a recording mode, a reproducing mode and a stop mode;

(d) control means for controlling said first and second recording and/or reproducing means and said drive means;

(e) said control means including means for causing said first recording means to record a first information unit signal and for causing said second recording means to record a first data unit signal relating to said first information unit signal at a position on the rear side of said first information unit signal; and (f) said control means including means for causing said second recording means to record a second information unit signal at a position on the rear side of said first information unit signal and for causing said second recording means to record a second data unit signal relating to said second information unit signal and said first data unit signal at a position on the rear side of said second information unit signal.

14. The recording and/or reproducing apparatus according to claim 13, in which said second recording means records said second information unit signal on an end portion of said first information unit signal or a start portion of said first data unit signal and records said second data unit signal relating to said second information unit signal and said first unit data signal on the rear side of said second information unit signal.

15. The recording and/or reproducing apparatus according to claim 13, in which said first recording means records said first information unit signal on a first track and records said first data unit signal relating to said first information unit signal on a second track from a position corresponding to the rear side of said first information unit signal, while said second recording means records said second information unit signal on said first track from a position corresponding to the rear side of said first information unit signal and records said second data unit signal and said first data unit signal on said second track from a position corresponding to the rear side of said second information unit signal.

16. The recording and/or reproducing apparatus according to claim 15, in which said second recording means records said second information unit signal on said first recording track from a position corresponding to the end portion of said first information unit signal or the start portion of said first data unit signal and records said data unit signal relating to said second information unit signal and said first data unit signal on said second track from a position corresponding to the rear side of said second information unit signal.

17. The recording and/or reproducing apparatus according to claim 15, in which said second recording means records said second information unit signal on said first track from a position corresponding to the end portion of said first information unit signal or the start portion of said first data unit signal and records said second data unit signal relating to said second information unit signal and said first unit data signal on said second track from a position corresponding to the end portion of said second information unit signal.

18. The recording and/or reproducing appartus according to claim 13, in which said information unit signal is formed of an audio signal.

19. The recording and/or reproducing apparatus according to claim 13, in which said data unit signal is formed of a signal containing a recording time data of said information unit signal.

20. The recording and/or reproducing apparatus according to claim 13, in which said data unit signal is formed of a signal containing a priority number data for said recorded information unit signals.

21. The recording and/or reproducing apparatus according to claim 13, in which said data unit signal is a data signal indicative of a movable position of said recording medium and formed of a signal containing a data signal indicative of a start position or end position of said information unit signal.

22. The recording and/or reproducing apparatus according to claim 13, in which a control signal for controlling the movement of said recording medium is recorded together with said information unit signal.

23. The recording and/or reproducing apparatus according to claim 22, in which said control signal is a predetermined low frequency signal.

24. The recording and/or reproducing apparatus according to claim 13, in which said recording medium is formed of a magnetic tape.

25. The recording and/or reproducing apparatus according to claim 13, further comprising memory means for storing all of contents of said data unit signal upon recording and/or reproducing and display means for displaying the contents of said data unit signal derived from said memory means.

26. The recording and/or reproducing apparatus according to claim 25, further comprising selective display means for selectively displaying the content of each data unit signal from said memory means.

27. The recording and/or reproducing apparatus according to claim 26, further comprising searching means for searching a predetermined information unit signal corresponding to a predetermined data unit signal displayed by said selective display means.

28. The recording and/or reproducing apparatus according to claim 13 or 25, further comprising means through which an external user terminal apparatus is connectable with said recording and/or reproducing apparatus, said external user terminal apparatus including a microphone to supply said information unit signal through said first recording and/or reproducing means to said recording medium and operating means capable of operating said control means, wherein said operating means serves to record on said recording medium and to store in said memory means a predetermined identification signal corresponding to said information unit signal as said data unit signal.

29. The recording and/or reproducing apparatus according to claim 28, in which said identification signal includes a priority signal which indicates the priority order of a plurality of information unit signals recorded on said recording medium when they are reproduced.

30. The recording and/or reproducing apparatus according to claim 28, further comprising display means for displaying said identification signal.

* * * * *